Feb. 8, 1938.    G. W. FLANAGAN    2,107,436
ARTIFICIAL BAIT OR LURE
Filed Sept. 24, 1934
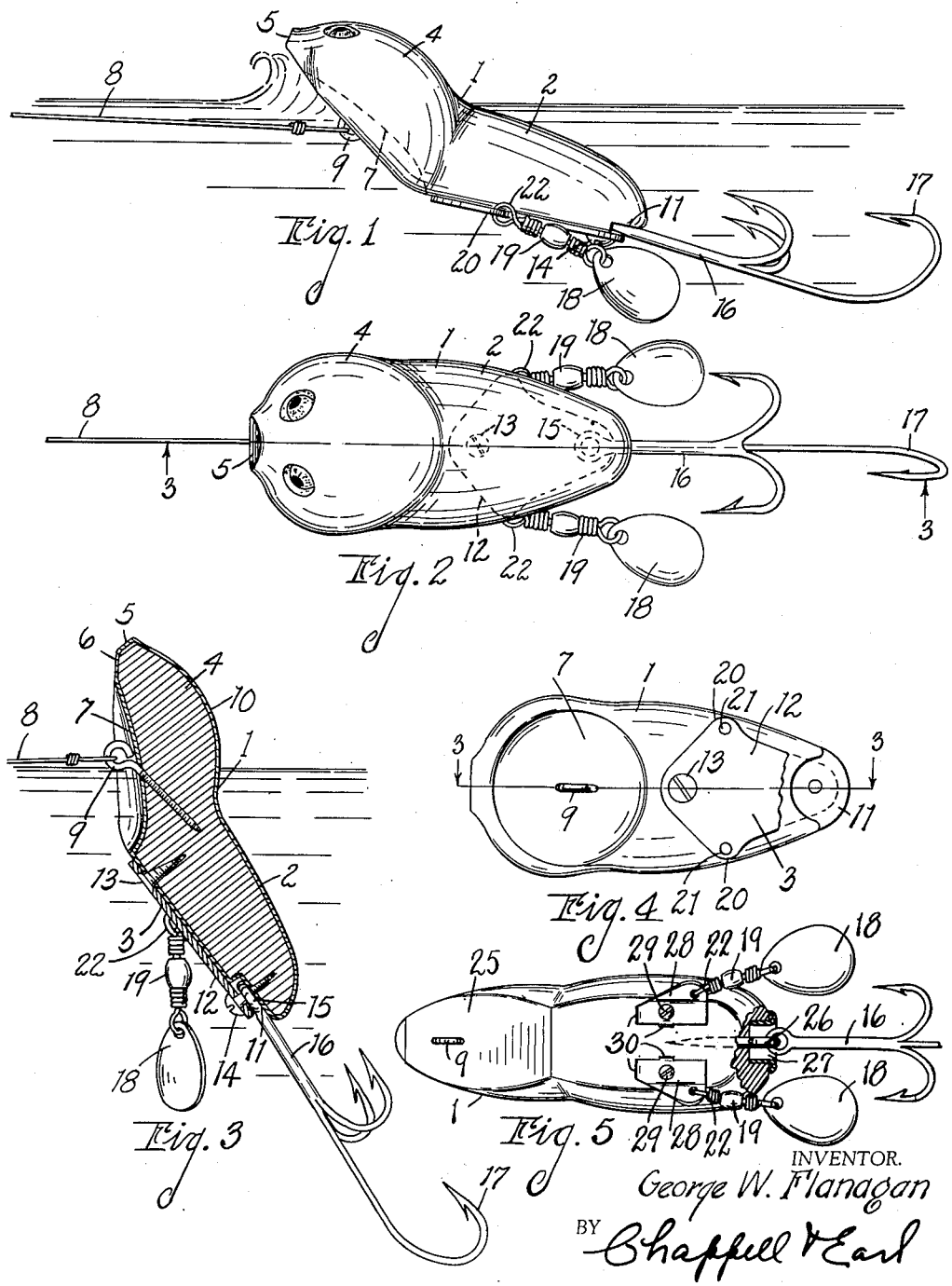
INVENTOR.
George W. Flanagan
BY Chappell & Earl
ATTORNEYS Patented Feb. 8, 1938

2,107,436

UNITED STATES PATENT OFFICE 2,107,436

ARTIFICIAL BAIT OR LURE

George W. Flanagan, Chicago, Ill.

Application September 24, 1934, Serial No. 745,269

4 Claims. (Cl. 43—39)

The main objects of this invention are:

First, to provide an artificial bait or lure of the surface type which effectively simulates a swimming animal when propelled through the water.

Second, to provide an artificial bait or lure in which the hooks are arranged and supported so as to effectively receive a strike and at the same time the bait may be propelled through weeds and other vegetation without danger of becoming snagged.

Third, to provide an improved bait or lure having these advantages which is simple and economical in its parts.

Further objects and advantages pertaining to details of construction and operation will appear from the description to follow. The invention is defined in the claims. A preferred embodiment of my invention is illustrated in the accompanying drawing, in which:

Fig. 1 is a side elevation of my improved bait or lure as it is propelled in the water, the water being conventionally illustrated.

Fig. 2 is a plan view.

Fig. 3 is a longitudinal section on a line corresponding to line 3—3 of Figs. 2 and 4, the bait being shown in a position of rest in the water.

Fig. 4 is a fragmentary bottom view.

Fig. 5 is an inverted or bottom view of a modified form or embodiment of my invention with portions broken away to better disclose the details of the hook attaching means.

My improved bait or lure comprises a body 1 formed preferably of wood or other buoyant material. The body portion proper of the bait 2 is rearwardly tapered and has a flat bottom 3 and transversely curved back and sides. The integral head 4 is upwardly inclined, the back and sides of the head being convexly curved and the head terminating in a short nose 5 having an upwardly inclined under surface 6. The convexly curved head merges into the back and side walls of the body portion. The head portion has a concave recess 7 on its under side. The attaching means for the line 8, preferably a screw eye 9, is disposed centrally of this concave recess and in a substantially spaced relation to the nose or tip of the head.

The body is suitably finished with a waterproof coating 10, no effort being made to show the relative thickness of this coating. The bottom of the body portion has an undercut recess 11 at its rear end. The bottom plate 12, preferably of metal is secured on the bottom of the body by means of the screws 13 and 14, the screw 14 extending through the recess and engaging the eye 15 in the shank 16 of the hook 17. The hook illustrated is a multiple hook with all of the hook prongs turned upwardly. By thus attaching the hook, it is free to swing laterally but is held with the hook prongs presented upwardly.

Spoons 18 are attached by the swivel links 19 to the lateral projections 20 of the bottom plate, these projections having holes 21 receiving the eyes 22 at the inner ends of the links so that the spoons are attached for rotative and free swinging movement. The weight incident to the plate and the hook is such that when at rest in the water the body assumes the position shown in Fig. 3. However, when propelled through the water the body assumes a position approximating that shown in Fig. 1 and takes a zig-zag course through the water and the spoons, having some movement independently of the body, quite effectively simulate the legs of an animal swimming.

In Fig. 5, I show a modified form of my invention in which the recess 7 is omitted from the upwardly inclined head so that a substantially flat upwardly inclined plane 25 is presented. The hook 16 is attached to the rear end of the body by means of the screw eye 26, the screw eye being seated in a socket 27 receiving a portion of the eye of the hook, thereby limiting the swinging movement of the hook, the hook, however, having greater flexibility or freedom of movement than in the mounting shown in Figs. 1 to 4 inclusive in which the movement is substantially limited to the one plane, whereas in the embodiment shown in Fig. 5, it can swing in any direction, but the swinging movement is limited so that it cannot follow with the body or the spoons.

In this embodiment, a pair of spoon attaching plates 28 are provided, these being secured to the underside of the body by means of screws 29 and lugs or prongs indicated at 30. With this arrangement, the spoons can be attached to any size of body and in any desired position, whereas when the plate is employed, it must be more or less arbitrarily positioned or located. The embodiment shown in Fig. 5 is somewhat more economical to produce than that shown in Figs. 1 to 4 inclusive.

My improved bait is very attractive, is substantially weedless, and its action in the water may be considerably varied by variation in the speed with which it is propelled in the water, and by permitting it to stop or substantially stop and then again move it through the water. I have not attempted to illustrate or describe other embodiments or adaptations of my invention as it is believed that this disclosure will enable those skilled in the art to embody or adapt my improvements as may be desired.

Having thus described my invention, what I claim as new and desire to secure by Letters Patent is:

1. An artificial bait or lure comprising a rearwardly tapered body portion having a flat bottom with a recess at the rear end thereof, said body portion having a transversely curved back and sides, and an integral head portion disposed in an upwardly inclined relation relative to the body portion and having convexly curved back and sides merging into the back and sides of the body portion, the head portion terminating in a short nose having a flat under surface, the under side of the head portion having a concave recess therein with a line attaching eye disposed centrally thereof and in substantially spaced relation to the nose portion of the head, a bottom plate secured upon the flat bottom portion of the body with its rear end in overlapping relation to said recess at the rear of the body, said plate having laterally projecting portions disposed midway of the length of the body portion, a hook provided with a shank having an eye disposed in said recess in said body portion between said body portion and said bottom plate, an attaching screw arranged through said plate to engage said eye and threaded into said body portion, and spoons attached to said lateral projections of said bottom plate by swivel links.

2. An artificial bait or lure comprising a rearwardly tapered body portion having a flat bottom, said body portion having a transversely curved back and sides, and an integral head portion disposed in an upwardly inclined relation relative to the body portion and having convexly curved back and sides merging into the back and sides of the body portion, the head portion terminating in a short nose having a flat under surface, the under side of the head portion having a concave recess therein with a line attaching eye disposed centrally thereof and in substantially spaced relation to the nose portion of the head, a bottom plate secured upon the flat bottom portion of the body, said plate having laterally projecting portions disposed midway of the length of the body portion, a hook mounted on said body, and spoons attached to said lateral projections of said bottom plate by swivel links.

3. An artificial bait or lure comprising a rearwardly tapered body portion having a flat bottom with a recess at the rear end thereof, said body portion having a transversely curved back and sides, and an integral head portion disposed in an upwardly inclined relation relative to the body portion and having convexly curved back and sides merging into the back and sides of the body portion, the head portion terminating in a nose having a flat upwardly inclined under surface, the under side of the head portion having a concave recess therein with a line attaching means disposed centrally thereof and in substantially spaced relation to the nose portion of the head, a bottom plate secured upon the flat bottom portion of the body with its rear end in overlapping relation to said recess at the rear of the body, a hook provided with a shank having an eye disposed in said recess in said body portion between said body portion and said bottom plate, an attaching member arranged through said plate to engage said eye and engaging said body portion, and spoons attached at the sides of said bottom plate.

4. An artificial bait or lure comprising a body portion having a flat bottom and an upwardly inclined head portion, a line attaching means on the under side of the head portion, a hook connected to the rear end of the body by means limiting the swinging movement thereof relative to the body, a pair of spinner members, and means for attaching the spinner members to the flat bottom of the body comprising plates mounted thereon and provided with laterally projecting portions to which the spinner members are connected.

GEORGE W. FLANAGAN.